United States Patent Office

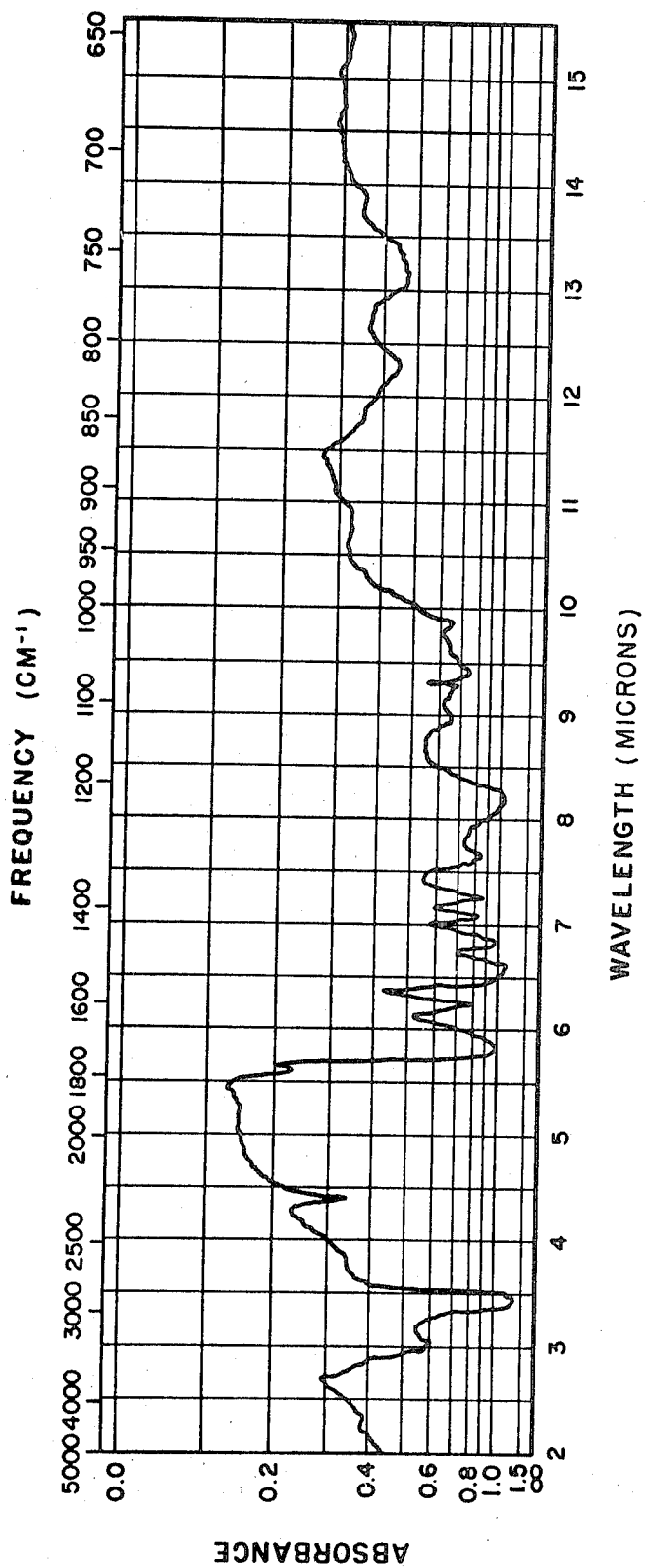

3,637,543
Patented Jan. 25, 1972

1

3,637,543
FIRE RESISTANT POLYURETHANE FOAMS FROM POLYISOCYANATES, POLYOLS, AND CARBOXYLIC ACID DERIVATIVES
Stanley T. Kus, Griffith, and Fred W. Koenig, Highland, Ind., assignors to Standard Oil Company, Chicago, Ill.
Continuation-in-part of applications Ser. No. 420,500, Dec. 23, 1964, Ser. No. 420,774, Dec. 23, 1964, Ser. No. 448,253, Apr. 15, 1965, and Ser. No. 691,729, Dec. 19, 1967, all now abandoned. This application Nov. 12, 1969, Ser. No. 876,060
Int. Cl. C08g 22/44
U.S. Cl. 260—2.5 AJ                                   23 Claims

ABSTRACT OF THE DISCLOSURE

Novel thermally stable resins and foams are prepared by reacting without the addition of external heat or pressure a polyfunctional aromatic carboxylic acid derivative comprising a benzene nucleus substituted by members selected from the group consisting of anhydride, carboxyl, or acyl halide with a polyarylpolyisocyanate and a polyol containing at least three hydroxyl groups. The products of this invention are useful for insulation of walls, for fire-proofing buildings and the like.

---

This application is a continuation-in-part of Ser. No. 420,500, filed Dec. 23, 1964, No. 420,774, filed Dec. 23, 1964, Ser. No. 448,253, filed Apr. 15, 1965, and Ser. No. 691,729, filed Dec. 19, 1967, all by the same inventors and all of which are now abandoned.

This invention relates to novel flame-resistant, thermally stable foamable modified polyurethane resins and to a process for making same.

It has not been feasible heretofore to prepare thermally stable, flame-resistant polyurethane foams. The conventional commercial polyurethane foam prepared by reacting a polyhydric alcohol with a polyarylpolyisocyanate decomposes at temperatures of about 130° C. Even the so-called thermally stable polyurethanes sustain a weight loss in excess of 80% when placed in a flame.

Novel thermally stable, flame-resistant modified polyurethane foams have been discovered. These foams when placed in a flame sustain only a low weight loss and generate much less smoke than prior art foams. We use the term "thermally stable" to convey the relative noncombustibility of the foams of this invention. Thus the term includes the resistance of the foams of this invention to initially support a flame ("flame-resistance"), the slow rate of combustion when ignition does occur, and the relatively low smoke evolution during the slow combustion. It has been further discovered that flame-resistant, thermally stable foams are produced when aromatic acids, aromatic anhydrides, acyl halides or a mixture of these are reacted with polyarylpolyisocyanates and polyols at ambient or room temperatures without the addition of external heat or pressure to the reaction system.

The flame-resistant modified polyurethanes are the reaction products of polyarylpolyisocyanates and an aromatic acid, anhydride, acyl halide or a mixture of these and a polyol having at least three active hydroxyl groups. The modified polyurethane self-foaming resins and foams are prepared by reacting: (1) a liquid polyarylpolyisocyanate which contains at least two interconnected aromatic rings having at least one isocyanato group per aromatic ring, (2) a polyfunctional aromatic carboxylic acid derivative comprising an aromatic nucleus substituted by carbonyl-based members selected from the group consisting of carboxyl, acyl halide and anhydride or any combination of these and (3) a polyol or a mixture or blend of polyols having at least three hydroxyl groups per mole and a molecular weight below 2,000. The term "carbonyl-based members" is used herein to refer generically to carboxyl, acyl halide and anhydride groups.

The liquid polyarylpolyisocyanates useful in this process contain at lest two aromatic rings with one isocyanato group in each aromatic ring. These aromatic rings are suitably interconnected by either sulfone, sulfoxide, methylene, propylene, or a carbonyl linkage or by two methylene groups connected to a benzene ring substituted by an isocyanato group. Polyarylpolyisocyanates which are isocyanate-substituted biphenyls are also useful in this process. In all of these cases the aromatic rings of the liquid polyarylpolyisocyanates can be substituted by methyl, ethyl or propyl groups. Specific examples of suitable liquid polyarylpolyisocyanates for use with the invention include: polymethylene polyphenylisocyanate having from 2 to 10 or 3 to 6 benzene rings and liquid mixtures at room temperature of polymethylene polyphenylisocyanate with one or more of the following polyarylpolyisocyanates: 4,4'-diphenylmethylene diisocyanate; diphenylmethylene 3,3'-diisocyanate; diphenyl diisocyanate; diphenylsulfone diisocyanate; diphenylsulfide diisocyanate; diphenyl sulfoxide diisocyanate; and diphenylpropane diisocyanate. Polymethylene polyphenylisocyanates having an average benzene ring content of about 2.1 to 3.5 per molecule are particularly suitable isocyanates.

The polyfunctional aromatic carboxylic acid derivatives useful in making the flame-resistant foams of this invention have the aromatic nucleus substituted by the same or different members selected from the group consisting of carboxyl, anhydride or acyl halide. Other substituents may be present on the aromatic nucleus; for example, alkyl groups containing one to four carbon atoms, nitro groups and halide groups. These aromatic acid derivatives are also useful in preparing liquid non-polymeric foam precursors. Illustrative polyfunctional aromatic carboxylic acid derivatives useful in our process are trimellitic acid anhydride, trimellitic acid, double anhydride or trimellitic anhydride, trimellitic acid halide, pyromellitic dianhydride, pyromellitic acid, terephthalic acid, 1,3,3-trimethyl-1-phenylindane-4',6-dicarboxylic acid, phthalic acid, phthalic anhydride, isophthalic acid, trimesic acid, 3,4,3',4' - (tetracarboxybenzophenone, 3,4,3' - tricarboxybenzophenone, 4,4'-carboxybenzophenone, the acyl halides of the 3,4,3',4' and 3',4,3' and 4,4'-carboxybenzophenones, the dianhydride of 3,4,3',3'-tetracarboxybenzophenone, the monoanhydride of 3,4,3',4'-tetracarboxybenzophenone and mixtures thereof. The 4-trimellitate bis anhydride formed when trimellitic anhydride is reacted with a polyol as disclosed in U.S. Pat. No. 3,183,248 by Arthur G. Hirsch et al., is also useful. These compounds have two trimellitic acid anhydride groups joined through the carboxylic acid positions by ester linkages. These ester linkages can be joined by an alkylene group. Compounds joined by an ethylene or propylene group the ester linkages are joined by propylenes the middle carbon can have an organic acid or ester attached to it without losing effectiveness in our process.

To a degree the unique flame-resistance of the resins and foams may be attributed to these aromatic components. The foam is not flame-resistant when these aromatic carboxylic acid derivatives are left out.

When aliphatic anhydrides or acids are employed, the foams have a very high weight loss, between 60–90%, and in many instances support a flame. Therefore, it is imperative that aromatic compounds be used. The best results are obtained with disubstituted compounds having an anhydride group and also a carboxyl group or acyl halide group. The preferred aromatic compounds are substituted benzenes where one substituent is an anhydride and the other is a carboxylic acid, acyl halide or an anhydride; trimellitic anhydride, the acid chloride or trimellitic anhyodride and pyromellitic dianhydride are good examples. Excellent results are, however, obtained with other aromatic acids. For example, trimesic, terephthalic acid and trimellitic acid give foams which have a very low burning weight loss. Good flame-resistant foams are also obtained when a mixture of the acid, or anhydrides, is used. In many cases these mixtures show a lower burning weight loss than when only pure aromatic acids or anhydrides are utilized.

It must be noted that a large excess of the aromatic acid derivatives, the liquid polyarylpoliisocyanates or polyols, reduces the thermal stability of the foams. In a suitable formulation 0.5 to 1.5 isocyanato groups are used for each acid, anhydride, acyl halide or hydroxyl group.

In continuous operations the liquid polyarylpolyisocyanate and aromatic acid derivative are charged immediately and then the polyol is added into the reaction zone. In a suitable process the aromatic acid derivative is mixed with the liquid polyarylpolyisocyanate and the polyol is then added to this composition.

Advantageously, 0.5 to about 1.5 moles of the aromatic acids, anhydrides or acyl halides are reacted with one mole of the liquid polyarylpolyisocyanate, and the molar ratio of the polyol to the liquid polyarylpolyisocyanate aromatic carboxylic acid derivative composition is kept at 0.25:1.0 to 0.75:1.0. In a suitable formulation the equivalent ratio of the liquid polyarylpolyisocyanate to the polyfunctional aromatic carboxylic acid derivative ranges between about 0.6:1.0 to 4.0:1.0 and the equivalent ratio of the polyol to the liquid polyarylpolyisocyanate aromatic carboxylic acid derivative is about 0.1:1.0 to 3.0:1.0. In the preferred formulation the equivalent ratio of said liquid polyarylpolyisocyanate to the polyfunctional aromatic carboxylic acid derivative is 1.2:1.0 to 2.2:1.0. The equivalent ratio of the polyol to the liquid polyarylpolyisocyanate polyfunctional aromatic carboxylic acid derivative is 0.1:1.0 to 0.9:1.0. In some instances the preferred equivalent ratio is 0.2:1.0 to 0.4:1.0. (The term "equivalent ratio" is used here to indicate the ratio between the number of chemical equivalents (i.e., molecular weight÷functionality) present in a given weight of any of the various foam components. Alternately, any numerical value representing such ratio may be described in terms of the ratio of the number of functional groups present of one type to those of another type. For example, "The equivalent ratio of polyarylpolyisocyanate to trimellitic acid anhydride is 1.0:1.0," can be alternately expressed as "The ratio of isocyanato groups to anhydride plus carboxyl groups is 1.0:1.0"). In our calculations we have assigned a functionality of 1 (one) to an anhydride group. All ratios are calculated using the initial functionality of the starting materials.

Thermally stable resins and foams are also produced when a liquid non-polymeric foam precursor is reacted with the polyol. The foam precursors are reaction products of a liquid polyarylpolyisocyanate and a polyfunctional aromatic carboxylic acid derivative described above. The polyfunctional aromatic acid derivatives described above are solubilized in a liquid polyarylpolyisocyanate having at least two aromatic rings with one isocyanato group on each ring. Specific examples of suitable polyarylpolyisocyanates useful for the preparation of liquid non-polymeric foam precursor include: polymethylene polyphenylisocyanate having from two to ten benzene rings each substituted by one isocyanato group and liquid mixtures at room temperature of polymethylene polyphenylisocyanates and one or more of the following polyarylpolyisocyanates: 4,4'-diphenylmethylene diisocyanate; 3,3'-diphenylmethylene diisocyanate; diphenyl diisocyanate; diphenylsulfone diisocyanate; diphenyl sulfide diisocyanate, diphenylsulfoxide diisocyanate; and diphenylpropane diisocyanate. Polymethylene polyphenylisocyanates having an average benzene ring content of about 2.1 to 3.5 per molecule are particularly suitable isocyanates. Illustrative aromatic carboxylic acid derivatives useful in preparing liquid non-polymeric foam precursors include trimellitic acid anhydride, trimellitic acid, double anhydride of trimellitic anhydride, trimellitic acid halide, pyromellitic dianhydride, pyromellitic acid, terephthalic acid, phthalic acid, isophthalic acid, trimesic acid, 3,4,3',4'-tetracarboxybenzophenone.

Any polyarylpolyisocyanate or mixture of those disclosed above which is liquid at room temperature or in the temperature of about 50 to 100° F. is an effective solubilizing agent for the polyfunctional aromatic carboxylic acid derivatives particularly trimellitic acid anhydride. The solubilization of the trimellitic acid anhydride or its derivatives will proceed at room temperature if the polyarylpolyisocyanate is liquid at that temperature, but higher melting polyarylpolyisocyanates can be used when slight heating is applied. The preferred polyarylpolyisocyanates or mixtures of these are liquid at room temperature.

A thermally stable resin and foam is produced when a liquid non-polymeric foam precursor is prepared by reacting (1) a polyarylpolyisocyanate which polyarylpolyisocyanate contains at least two interconnected aromatic rings having at least one isocyanato group per benzene ring with (2) a polyfunctional aromatic carboxylic acid derivative comprising a benzene nucleus substituted by carbonyl-based members selected from the group consisting of an anhydride, a carboxyl or an acyl halide and wherein the equivalent ratio of the polyarylpolyisocyanate to the polyfunctional aromatic carboxylic acid derivative is 0.6:1.0 to 4.0:1.0 and wherein the foam precursor is then reacted with a polyol or a mixture of polyols having a molecular weight of less than 2,000 and having at least three hydroxyl groups per mole in an amount such that the equivalent ratio of the polyol to the polyarylpolyisocyanate polyfunctional aromatic carboxylic acid derivative foam precursor is 0.1:1.0 to 3.0:1.0; however, the mole weight ratio of the polyol to the foam precursor can be 0.25 to 0.75. In a suitable formulation trimellitic acid anhydride is reacted with the liquid polyarylpolyisocyanate in a mole ratio of 1.5 to 4.5. Advantageously, an equivalent ratio of the liquid polyarylpolyisocyanate to trimellitic acid of 0.6:1.0 to 4.0:1.0 is used and the equivalent ratio of the polyol to the polyarylpolyisocyanate polyfunctional aromatic carboxylic acid derivative foam precursor is 0.1:1.0 to 0.9:1.0. The number of equivalents of the foam precursor is calculated as the sum of the equivalents of each of the unreacted foam precursor components.

In an alternative embodiment of this invention it has also been discovered that better surface burn properties are obtained when modified polyurethane self-foaming resins and foams are prepared from the polyfunctional aromatic acid derivatives and polyarylpolyisocyanates hereinbefore described and polyols in the presence of catalytic amounts of water sufficient to initiate the reaction. The amount of water added can vary from 0.1 to about 10 percent by weight of the reactants. In the preferred process the amount of water added varies from about 0.5 to about 1.5 percent. The addition of water initiates the reaction which produces a modified polyurethane resin or foam which exhibits a superior flame retardance and resistance to surface burn. The modified polyurethane foams can also be prepared by reacting (1) a liquid polyarylpolyisocyanate which contains at least two interconnected aromatic rings having at least one isocyanato group per aromatic ring, (2) a polyfunctional aromatic carboxylic acid derivative comprising an aromatic nucleus substituted by members selected from the group consisting of an anhydride, a carboxylic acid or an acyl halide and wherein the equivalent ratio of the polyarylpolyisocyanate to the aromatic acid derivative is 0.5 to 2.5, and (3) a polyol or mixture of polyols having a molecular weight of less than 2,000 and having at least three hydroxyl groups per mole.

Water has been used as a blowing agent in the urethane art to prepare conventional polyurethane forms. In that process, the isocyanate is reacted with a polyol. The water added reacts with the isocyanate to form carbon dioxide. This gas works as an in situ blowing agent. The polyurethane foams produced by that process burn and have no flame retardant properties. In contrast it is believed that in our process the water is used to initiate the reaction between aromatic acids or anhydrides, and polyarylpolyisocyanates which further react with the polyols. In our process it is not necessary to use water as a blowing agent; if desired, external blowing agents may be used. The function of water is to initiate the reaction between the polyarylpolyisocyanates, aromatic acids or anhydrides and polyols.

To produce thermally-resistant foams by the process of this invention without the necessity for external heating, polyols are employed. The most common polyols used in our process are polyethers and polyesters but amine, sucrose and phosphorous-containing polyols have also been used. A representative polyol utilized in our process is a propylene oxide adduct of pentaerythritol. This polyol has an average molecular weight of 400 and a hydroxyl number of 560. Most commonly available polyols can be used in the foaming process. The only qualification to this is that the polyols should have at least three hydroxyl groups or an average of three hydroxyl groups per mole, and the molecular weight of the polyol should not exceed 2,000. When polyols having a molecular weight in excess of 2,000 are used, the resulting foams tend to lose their flame resistance. Unlike the conventional urethane stoichiometry the amount of polyol added can vary widely and be as low as 5–10% by weight based on total formula for our process.

The molar ratio of the polyol to the polyarylpolyisocyanate polyfunctional aromatic carboxylic acid derivative composition can vary from 0.25 to 0.75:1.00. Advantageously the equivalent ratio of the polyol to the polyarylpolyisocyanate polyfunctional aromatic carboxylic acid derivative is 0.1 to 3.0, preferably 0.15 to 0.90. The exact chemical structure of the polyol is not decisive as long as there are at least an average of three hydroxyl groups capable of reaction present. The common polyether polyols useful in this process include the following or mixtures of these polyols: poly (oxypropylene) adducts of trimethylolpropane, poly (oxypropylene) adducts of 1,2,6-hexanetriol, polypropylene oxide adducts of pentaerythritol, poly (oxypropylene)-poly (oxyethylene) adducts of ethylenediamine (block copolymers), poly (oxypropylene) adducts of sorbitol, polypropylene oxide adduct of sucrose, polypropylene oxide adduct of alpha-methyl glucoside, polypropylene oxide adduct of ethylene diamine, polypropylene oxide adduct of diethylene triamine, polypropylene oxide adduct of trimethylolpropane. The polyester polyols useful in our process are reaction products of dibasic or tribasic acids, alcohols or polyhydroxy alcohols and acids. Representative polyesters useful in our process are reaction products of isophthalic acid, succinic acid, tetrahydrophthalic acid, pimelic acid and fumaric acid, and polyhydroxy alcohols. Some useful alcohols include ethylene glycol, propylene glycol, butylene glycol, diethylene glycol, dipropylene glycol, tetraethylene glycol, pentaerythritol and sorbitol. All of these ester-polyols have free hydroxyl groups which make them useful in this reaction. The resulting polyester polyol has available for reaction at least three hydroxyl groups. Polyalkylene-glycols having less than three hydroxyl groups per mole are useful as diluents when used in conjunction with the polyols having three or more hydroxyl groups.

FOAMED RESINS

According to the invention novel thermally stable resins are produced, which by infra-red analysis appear to be modified polyurethanes. Although the infra-red specimen of the foam resins is difficult to interpret, they appear to have the characteristic urethane infra-red wavelengths of 3.05 and 5.83 microns. Other prominent infra-red wavelengths, 6.55, 7.62 and 8.13, appear and apparently are due to the stretching of the various urethane bonds; for example, the carbon nitrogen and carbon oxygen bonds.

Since according to infra-red analyses the foam is largely a polyurethane moiety, it would seem that the thermal stability of the polyurethane foams might be due to some kind of cross-linking. This, however, has not been established. It is believed that the unique thermal stability of the foams can be attributed to a substantial degree to the rigidity of the backbone chain produced when polyarylpolyisocyanates and polyfunctional aromatic acid derivatives resistant to pyrolysis are reacted. It appears that even if cross-linked, the polyurethane foams are made flame-resistant by the various bonds formed by the aromatic acids, acid anhydrides or acyl halides and polyarylpolyisocyanates which are incorporated in the modified polyurethane foams. The modified polyurethane foam can apparently be made flame-resistant when certain thermally-stable bonds are incorporated into the resins and foams. Imide and amide bonds are examples of such bonds. It is not necessary to start out with the imide or amide bonds but the starting compound should be able to form the bonds under the exothermic reaction conditions of our process.

The manner in which the modified polyurethane and polyamideimide and other possible polymer moieties coexist is not known. However, it appears that when the polyol, liquid polyarylisocyanate and polyfunctional aromatic acid derivatives are mixed together, the reaction of polyol with polyarylpolyisocyanate proceeds rapidly to produce a polyurethane moiety. The reactions to produce polyamide-imide are slower but are increased by higher temperature. The increased temperature caused by the exothermic reaction that produces polyurethane will tend to increase the rate of formation of polyamide-imide. It is usually desirable to cure the foam at elevated temperatures for a period of time to increase the formation of the polyamide-imide component.

The bonds of the repeating polymer chains can hypothetically be classified as having a urethane group surrounded on the nitrogen side by the rigid molecular residue of the polyarylpolyisocyanate and on the other side by the rigid structure derived from the aromatic acid derivatives. This chain is interrupted at certain points by structures derived from the polyols.

Various methods of producing our foam are practicable. In the so-called "one-shot" method the aromatic acid derivative is rapidly mixed with either a polyarylployisocyanate or polyol and the resulting mixture is quickly mixed with the remaining component. In another version all three reactants can be added instantaneously. Another method is to prepare a polyarylpolyisocyanate polyfunctional aromatic acid derivative foam precursor mix and react this with the polyol. All of these reactions take place without the addition of external heat or pressure to the reaction system. Any method that will lead to the formation of gas from within the reaction mixture will produce foam products. In order to get very good foams it is helpful to use a blowing agent. The most useful blowing agents are fluorine-containing lower alkanes which boil above 20° C. The following are the preferred external blowing agents:

| Blowing agent: | Boiling point |
|---|---|
| $CCl_3F$ | 23.8° C. |
| $CBrF_2$—$CBrF_2$ | 47.5° C. |
| $CCl_2F_2CClF_2$ | 47.6° C. |
| $CCl_2F$—$CCl_2$—$F$ | 92.8° C. |

In order to get a rapid foaming reaction, it may be convenient to use a catalyst. Many catalyst types are known but they can be categorized usually as organo metallics or tertiary amines. Of these, tertiary amines and organo-tin compounds are particularly effective. In the tertiary amines the substituents can be different organo groups or the same group; for example, they can be substituted benzene compounds, hetrocyclic compounds or aliphatic compounds. Suitable amines include triethylamine, diethylamine, and diethylcyclohexyl amine. Organo-tin compounds are also suitable catalysts. Since tin is a tetravalent element we can have four different hydrocarbon groups substituted on it, but they can also be all of the same group. These substituents can be aliphatic compounds having from one to six carbon atoms, they can be benzene or benzene derivatives or hetrocyclic compounds. Dibutyl tin dilaurate stannous octoate and dibutyl tin diacetate are particularly advantageous organo-tin catalysts.

The cell structure of the modified polyurethane foam is improved through certain additives; for example, a small amount of silicone. This silicone additive is employed in amounts of 2% or less. Amounts in the order of 0.2% are effective depending upon the type of silicone used. Poly(dimethyl siloxane) and poly(methylphenyl siloxanes) are particularly useful cell structure stabilizers.

In some instances it may be preferred to cure the foam at elevated temperatures. The curing may be suitably conducted from 15 minutes to 24 hours at 150° F. or it may be conducted for a shorter period of time at 150° F. and then followed by heating at temperatures of about 200 to 400° F. for 1 hour to about 12 hours. In some formulations the cure is helpful as it eliminates undesirable volatile halogen components. It is preferred to use a low temperature to cure since high temperature cures may decrease the insulating value of the foam but in general the nature of the cure, if one is used, depends upon the particular formulation employed.

In general the modified polyurethane foams have a density of from about one to twenty pounds per cubic foot. They are non-flammable and where combustion is induced, as with a flame, they sustain a low weight loss. Usually the weight loss does not exceed 30%. This is considered remarkable when compared to commercial so-called fire-resistant foams; such commercial foams have a burning weight loss in excess of 80%, and many support a flame outright. The novel foams retain their strength to a large degree even after they have been placed in a flame. The flame resistance and strength of these novel modified polyurethane foams make them extremely useful as insulating materials. Suitable uses, for example, are in the insulation of walls, for fire-proofing buildings and insulation of ovens, pipes and the like. These foams have great commercial value because they can be easily processed; for example, they do not have to be prefabricated but can be prepared and foamed at the place and in the position where they are to be used.

The foams were tested for the thermal properties of flame-resistance and smoking tendency using two tests. In the first test, the disc test, the heat of the flame is 2400° F. The sample is placed 1¼" from the nozzle. The gas and oxygen flow is measured on a rotometer; the rate for the fuel gas stream is 0.8 standard cubic feet per hour and the rate of oxygen is 1.1 standard cubic feet per hour and the ratio is 0.8 volumes of gas for each 1.1 volume of oxygen. The sample is cut in ¾" thickness having a 5" diameter. The sample is placed in a flame 1¼" from the nozzle and is rotated during the flame test. Each rotation takes 48 seconds, there being a total of four revolutions. Thus, the sample has been in the flame for 192 seconds. The sample is then weighed, the weight is compared to the original weight and the loss in weight is calculated. From this we obtain the percent of burning weight loss.

In the second test, the "Chimney Test," the sample foams were evaluated for their smoking tendencies. The dimensions of each sample (called a "stick") were ¾" x ¾" x 5". The samples were aged before testing for 24 hours at about 73° F. and about 51% relative humidity. The apparatus within which the actual testing is conducted is called the chimney. It is constructed of galvanized steel panels of dimensions 2¼" x 12" which form three sides. The fourth side of the chimney is of course left open to provide for sample placement. Channels are provided for inserting a wired safety glass as the front panel of the chimney. Foam samples are mounted on three nails protruding from the back panel. The stick dimensions are the same as in the disc test. The sample stick is mounted so that the bottom of the sample is two inches above the bottom of the chimney. The flame source is a bunsen burner fitted with a needle valve and adjustable air intake. The fuel mixture is monitored and is adjusted so that the temperature of the flame, as measured by thermocouple, is maintained at 1660±10° F. The thermocouple tip is set at the tip of the flame's inner cone. With the weighed sample centered in the chimney, the tip of the inner cone of the flame is held in contact with the bottom of the sample for ten seconds and then removed. To quantitatively determine the smoke density of the tested samples, a Beckman model 912 smoke meter was used in conjunction with a standard recorder to translate signals from the photocell into a graphic plot. The photocell unit was positioned with the horizontal center line between reading ports four (4) inches above the top of the chimney. The base of the photocell unit was moved in the plane of the base of the chimney along an axis between the two bases to a position at which the axis between the two photocell arms passed through the zone of the maximum smoke generation. (The locus of this zone is principally determined by drafts in the hood within which the test is conducted.) The quantitative determination of smoke evolution was made by measuring the area under the curve, plotted by the recorder, which area is reported as "smoke density."

The following examples are included as illustrations of the preparation of the polyurethane foam and are not intended as limitations thereof. All test results are from the "Disc Test" unless the "Chimney Test" is indicated.

EXAMPLE 1

Fifty grams of trimellitic anhydride were mixed in 100 grams of polymethylene polyphenylisocyanate having a molecular weight of 400, an equivalent weight of 134 and a functionality of 3. To this composition were added 20 grams of polypropylene oxide adduct of pentaerythritol, having an average molecular weight of 400 and a hydroxyl number of 560 and 50 grams of trichlorofluoromethane. Upon the addition of the polyols a foam began to form. The foam did not support the flame, and when placed in a flame there was a weight loss of 20.1%.

EXAMPLE 2

Forty grams of trimellitic anhydride were mixed in 100 grams of polymethylene polyphenylisocyanate having an average of three benzene rings, each substituted by an isocyanato group and having a molecular weight of 400, an equivalent weight of 134 and a functionality of 3. To this composition were added 50 grams of a polyether polyol blend consisting of three equal parts of a sucrose based polyether polyol, a phosphorus containing polyether polyol and an amine containing polyether polyol. The blend has a hydroxyl number of 398 and an equivalent weight of 141. The blend also contains trichlorofluoromethane, a small amount of dibutyl tin diacetate, and a small amount of polysiloxane-glycol block copolymer silicone oil. To the polyol blend two grams of cobalt naphthenate and one gram of silicone oil, which is a polyalkyl or polyalkyl aryl siloxane having ether and/or hydroxyl groups, were added. Upon addition of the polyols to the trimellitic anhydride polymethylene polyphenylisocyanate mixture the foam began to form. The foam was cured at 150° F. for about 16 hours. The foam was found to be thermally stable. The infra-red spectra of the thermally stable foam is shown in FIG. 1.

EXAMPLE 3

Sixty grams of 1,3,3 trimethyl-1-phenylindane-4',6 dicarboxylic acid was substituted for trimellitic anhydride. The foam was cured successively at 200° F. for 45 min., 300° F. for 20 min. and 350° F. for 30 min. The cured foam had a density of 6.3 pcf and was flame-resistant.

EXAMPLE 4

Fifty grams of phthalic anhydride were mixed in 100 grams of polymethylene polyphenylisocyanate. To this mixture were added 100 grams of the polyether polyol of Example 2. Upon the addition of polyol a foam was formed.

EXAMPLE 5

Fifty grams of 4-acid chloride of trimellitic anhydride were solubilized in 100 grams of polymethylene polyphenylisocyanate having a molecular weight of 400, an equivalent weight of 134 and a functionality of 3. To this composition were added fifty grams of a polyether polyol blend consisting of three equal parts of a sucrose based polyether polyol, a phosphorus containing polyether polyol and an amine containing polyether polyol. The blend has a hydroxyl number of 398 and an equivalent weight of 141 and also contains trichlorofluoromethane, a small amount of dibutyl tin diacetate, and a small amount of polysiloxane-glycol block copolymer silicone oil. The exothermic reaction gave a good flame-resistant foam, the product is a high density foam and has the following properties. The foam was cured at the following temperatures and had the following properties:

| Curing temp., °F. | Curing time, minutes | Density | Compression (ASTM 1621-59T) strength, p.s.i. | Burning weight loss |
|---|---|---|---|---|
| R.T. | 0 | 3.9 | 45 | Below 30%. |
| 250 | 15 | 2.5 | 70 | Do. |
| 400 | 15 | 5.7 | 82 | Do. |

Good thermally stable flame-resistant foam can be prepared by the manner disclosed in Example 5 when only the benzene carboxylic acid derivative is varied. Fire-resistant foams were formed when in place of trimellitic acid chloride, trimellitic acid, trimesic acid, isophthalic acid and phenyl indane dicarboxylic acid and phthalic anhydride were used.

EXAMPLE 6

Several batches of foam precursor were made as follows: Forty grams of trimellitic anhydride were mixed in 100 grams of polymethylene polyphenylisocyanate having a molecular weight of 400, an equivalent weight of 134 and a functionality of 3. This mixture was continuously agitated until the trimellitic anhydride had solubilized in the polymethylene polyphenylisocyanate. A pumpable liquid was formed. These batches were allowed to stand for varying periods of time. At the end of the storage periods the viscosity of the foam precursor remained low enough to permit production of foam therefrom. Accordingly flame-resistant foams were formed when the precursor batches were mixed in the following formulations and post-cured one hour at 150° F.:

Component: Gms.
    Precursor _____ 140.0
    Polyether polyol [1] _____ 40.0
    Surfactant [2] _____ 0.5
    Trichlorofluoromethane _____ 50.0

[1] The propoxylated pentaerythritol of Example 1.
[2] DC 113—a silicone oil which is a polyalkyl/polyalkylaryl siloxane having ether and/or hydroxyl groups.

Representative Disc test properties were as follows:

Storage period (days):      Burn weight loss, percent
    1 _____ 28
    3 _____ 27
    14 _____ 25

EXAMPLE 7

Forty-one grams of the reaction product of trimellitic anhydride and ethylene glycol diacetate were solubilized in one equivalent of polymethylene polyphenylisocyanate having a molecular weight of 400, an equivalent weight of 134 and a functionality of 3. To this composition were added 50 grams of a polyether polyol blend consisting of three equal parts of a sucrose based polyether polyol, a phosphorus containing polyether polyol and an amine containing polyether polyol. The blend has a hydroxyl number of 398 and an equivalent weight of 141 and also contains trichlorofluoromethane, a small amount of dibutyl tin, diacetate, and a small amount of polysiloxane-glycol block copolymer silicone oil. A thermally stable foam is formed. The foam has a burning weight loss of 22%, a density of 4.0, an average compression strength of 10.0 and an average compression modulus of 340 as determined by ASTM 1621-59T.

EXAMPLE 8

Forty-one grams of the reaction product of trimellitic anhydride and glycerol triacetate were solubilized in 100 grams of polymethylene polyphenylisocyanate having a molecular weight of 400, an equivalent weight of 134 and a functionality of 3. To this composition were added fifty grams of a polyether polyol blend consisting of three equal parts of a sucrose based polyether polyol, a phosphorus containing polyether polyol and an amine containing polyether polyol. The blend has a hydroxyl number of 398 and an equivalent weight of 141 and also contains trichlorofluoromethane, a small amount of dibutyl tin diacetate, and a small amount of polysiloxane-glycol block copolymer silicon oil. A thermally stable foam is formed. The foam has a burning weight loss of 21%, a density of 4.5, an average compression strength of 5.3 and an average compression modulus of 217 as determined by ASTM 1621-59T. The strength of the foam is affected by the time and temperature of the cure.

EXAMPLE 9

Fifty grams of trimellitic anhydride were mixed in 100 grams of polymethylene polyphenylisocyanate having a molecular weight of 400, an equivalent weight of 134 and a functionality of 3; to this mixture were added 50 grams of the polypropylene oxide adduct of pentaerythritol, having an average mole weight of 400 and a hydroxyl number of 560, compounded with 50 grams of trichlorofluoromethane and three grams of polyalkyl or polyalkyl aryl siloxane silicone oil having ether and/or hydroxyl groups. This foam was cured at 150° F. for the number of hours given below, and the following results were obtained. The physical properties are determined according to ASTM 1621-59T test proceeding.

| Cure (hrs.) | Strength (ASTM 1621-59T) p.s.i. | Density (lbs. per cu. ft.) | Strength/density |
|---|---|---|---|
| 0 | 15.5 | 1.8 | 8.6 |
| 1 | 18.7 | 1.9 | 9.8 |
| 2 | 17.3 | 1.8 | 9.6 |
| 3 | 19.9 | 1.9 | 10.5 |
| 4 | 18.9 | 1.9 | 9.9 |
| 5 | 20.6 | 2.0 | 10.3 |
| 24 | 19.6 | 1.9 | 10.3 |

Example 10 shows that the effect of a catalyst is to accelerate the reaction without affecting the physical properties of the product which properties remain similar to the uncatalyzed foam disclosed in Example 1.

EXAMPLE 10

In a manner similar to Example 1, forty grams of trimellitic anhydride were solubilized in 100 grams of polymethylene polyphenylisocyanate having a molecular weight of 400, an equivalent weight of 134 and a functionality of 3. To this solution were added 50 grams of polypropylene oxide adduct of pentaerythritol, having an average molecular weight of 400, and a hydroxyl number of 560, eight grams of trichlorofluoromethane and one gram of n-methyl morpholine. Upon the addition of the polyol, the foam began to form. The foam is thermally stable and does not support a flame, and when placed in a flame it has a weight loss of 18%. Foams made in the identical manner above except for inclusion of different catalysts have the following properties:

| Run No. | Catalyst | Burning weight loss, percent | Density (lbs. per cu. ft.) |
|---|---|---|---|
| 2 | 1 g. triethyl amine | 24 | 4.2 |
| 3 | 1 g. trimethyl amine | 27 | 3.7 |
| 4 | 1 g. triethylene diamine | 24 | 4.5 |
| 5 | 1 g. dibutyl tin dilaureate | 22 | 4.7 |
| 6 | 1 g. triethyl amine plus 0.2 g. dibutyl tin dilaureate. | 23 | 4.3 |

EXAMPLE 11

Ffty-five grams of trimellitic anhydride were mixed in 100 grams of polymethylene polyphenylisocyanate having a molecular weight of 400, an equivalent weight of 134 and a functionality of 3. To this composition were added 50 grams of a blend of propylene oxide adduct of pentaerythritol having a molecular weight of 400 and a hydroxyl number of 560 and a propylene oxide adduct of ethylene diamine having a molecular weight of 500 and a hydroxyl number of 450. The blend contained 25 grams of each of the two polyols. To this mixture were added 25 grams of trichlorofluoromethane and two grams of polysiloxane-glycol block copolymer silicone oil. Upon addition of the polyol the foam began to form. The foam is thermally stable and does not support a flame. The equivalent ratio of the pentaerythritol-adduct to the ethylene diamine-adduct in the blend can vary from 0.5 to 1.5. The resulting foam was cured for one hour at 250° F. and for 1½ hours 350° F.

EXAMPLE 12

Ffty-five grams of trimellitic anhydride were mixed in 100 grams of polymethylene polyphenylisocyanate having a molecular weight of 340, an equivalent weight of 132 and a functionality of 2.5–2.7. To this composition were added 50 grams of a blend of propylene oxide adduct of sucrose diluted with glycerol so that the sucrose solution has an equivalent weight of 100 and a hydroxyl number of 560, and a propylene oxide adduct of ethylene diamine having a molecular weight of 500 and a hydroxyl number of 450. The blend contained 25 grams of each of the two polyols. To this mixture were added 27.5 grams of trichlorofluoromethane and two grams of polysiloxane-glycol block copolymer silicone oil. Upon addition of the polyol the foam began to form. The foam is thermally stable and does not support a flame. The equivalent ratio of the propylene oxide adduct of the solution of sucrose to the propylene oxide adduct of ethylene diamine can vary from 0.5 to 1.5. The resulting foam was cured for eight hours at 120° F.

EXAMPLE 13

One hundred grams of powdered trimellitic anhydride were mixed in 200 grams of polymethylene polyphenylsiocyanate having a molecular weight of 400, an equivalent weight of 134 and a functionality of 3. This mixture was continuously agitated until the trimellitic anhydride had solubilized in the polymethylene polyphenpylisocyanate. A pumpable liquid was formed. The liquid was then stored for seven days. At the end of this period the viscosity of the foam precursor remained low enough to make it useable in commercial foaming equipment. A flame-resistant foam was formed when 200 grams of the polyether polyol were added. The polyether polyol added is a blend consisting of three equal parts of a sucrose based polyether polyol, a phosphorus containing polyether polyol and an amine containing polyether polyol. The blend has a hydroxyl number of 398 and an equivalent weight of 141. The blend also contains trichlorofluoromethane, a small amount of dibutyl tin diacetate, and a small amount of polysiloxane-glycol block copolymer silicone oil. Upon addition of the polyol the foam began to form. The foam is thermally stable and does not support a flame.

EXAMPLE 14

One hundred grams of a mixture consisting of 50% trimellitic anhydride and 50% trimellitic acid were solubilized in 200 grams of polymethylene polyphenylisocyanate having a molecular weight of 400, an equivalent weight of 134 and a functionality of 3 as described in Example 1. The liquid was then stored for seven days. A flame-resistant foam was formed when 200 grams of the polyether polyol were added. The polyether polyol added is a blend consisting of three equal parts of a sucrose based polyether polyol, a phosphorus containing polyether polyol and an amine containing polyether polyol. The blend has a hydroxyl number of 398 and an equivalent weight of 141. The blend also contains trichlorofluoromethane, a small amount of dibutyl tin diacetate and a small amount of polysiloxane-glycol block copolymer silicone oil.

In a similar manner trimellitic anhydride, the acid chloride of trimellitic anhydride and related derivatives are mixed and solubilized in liquid polyarylpolyisocyanates or mixtures of these which are liquid at room temperature and have at least two aromatic rings with one isocyanato group on each aromatic ring. These solubilized products give fire-resistant foams when a polyol is added.

EXAMPLE 15

One hundred grams of polymethylene polyphenylisocyanate having a molecular weight of 400, an equivalent weight of 134 and a functionality of 3, and 60 grams of trimellitic anhydride were mixed. To this mix were added 20 grams of a polyether polyol identified as a polypropylene oxide adduct of pentaerythritol polyol having a molecular weight of approximately 400 and a hydroxyl number of 560, three grams of polyalkyl or polyaryl siloxane oil having ether and/or hydroxyl groups, 7.5 grams of trichlorofluoromethane and 1.5 grams of water. Upon the addition of water, the foaming reaction started. The entire mass was mixed vigorously until the slurry became too thick for further agitation. After a few minutes a rigid foam was formed. This foam was cured at 150° F. overnight (for about 12 hours). A flame retardant foam was produced having a burning weight loss of 16 percent and a density of 2.1 per cu. ft.

EXAMPLE 16

One hundred grams of polymethylene polyphenylisocyanate having a molecular weight of 400, an equivalent weight of 134 and a functionality of 3, and 60 grams of trimellitic anhydride were mixed. To this mixture were added 20 grams of polyol, identified in the runs below; and 3 grams polyalkyl or polyaryl siloxane silicone oil having ether and/or hydroxyl groups.

| Run No. | Polyol | Burning weight loss, percent | Compressive strength (ASTM 1621-551), p.s.i. | Density, p.c.f. | Strength/density |
|---|---|---|---|---|---|
| 1 | Polypropylene oxide adduct of pentaerythritol having a molecular weight of 400 and a hydroxyl number of 560. | 13.4 | 47.2 | 3.1 | 15.2 |
| 2 | Polypropylene oxide adduct of a solution of sucrose in a glycol diluent, having a molecular weight of 1,280 and a hydroxyl number of 160. | 15.8 | 30.5 | 2.5 | 12.2 |
| 3 | Polypropylene oxide adduct of ethylene diamine having a molecular weight of 500 and a hydroxyl number of 450. | 16.5 | 3.4 | 1.9 | 1.8 |
| 4 | Polypropylene oxide adduct of methylglucoside having a molecular weight of 524 and a hydroxyl number of 653. | 15.5 | 30.9 | 1.7 | 18.2 |
| 5 | Polypropylene oxide adduct of sorbitol having a molecular weight of 514 and a hydroxyl number of 653. | 15.6 | 29.9 | 2.5 | 12.0 |

EXAMPLE 17

One hundred grams of polymethylene polyphenylisocyanate having a molecular weight of 340, an equivalent weight of 132 and a functionality of 2.5–2.7, 30 grams trimellitic anhydride and three equivalents of an additional auxiliary aromatic additive as given in the runs below were mixed. To this mixture 20 grams of the polyether polyol polypropylene oxide adduct of pentaerythritol having a molecular weight of approximately 400 and a hydroxyl number of 560, three grams of polyalkyl or polyaryl siloxane silicone oil having ether and/or hydroxyl groups, and 2 grams water were added. Flame-resistant foams having the following physical properties were formed:

| Run No. | Auxiliary aromatic additive | Comp. strength (ASTM 1621-551), p.s.i. | Density, p.c.f. | Strength/density |
|---|---|---|---|---|
| 6 | Terephthalic acid | 45.0 | 3.5 | 12.9 |
| 7 | Pyromellitic dianhydride | 19.7 | 2.5 | 7.9 |
| 8 | Trimesic acid | 29.8 | 2.4 | 12.4 |
| 9 | Pyromellitic acid | 30.5 | 3.1 | 9.8 |
| 10 | Trimellitic anhydride | 31.0 | 1.9 | 16.3 |

EXAMPLE 18

In the following example the burning properties of a commercial polyurethane made from a polyester polyol based on chlorendic acid were compared to the foam of this invention. The commercial polyurethane foam used for comparison purposes is prepared by reacting polymethylene polyphenylisocyanate and a polyester polyol wherein the chlorendic acid is the acid component of the polyester polyol.

Our novel foams were prepared by mixing the aromatic acid, acyl halide or anhydride with polymethylene polyphenylisocyanate having a molecular weight of 400, an equivalent weight of 134 and a functionality of 3 and then adding a polyether polyol blend consisting of three equal parts of a sucrose based polyether polyol, a phosphorus containing polyether polyol and an amine containing polyether polyol. The blend as a hydroxyl number of 398 and an equivalent weight of 141. The blend also contains trichlorofluoromethane, a small amount of dibutyl tin diacetate, and a small amount of polysiloxane-glycol block copolymer silicone oil. In Table I the amount of the various reactants used is indicated. In the tests all samples are placed in an acetylene type flame torch for a given number of seconds. The sample was placed 1¼″ from the flame and was rotated around the flame. The heat at the point where the flame makes contact with the sample is 2400° F. Table II gives a representative flame test comparison of a commercial polyurethane foam and our novel foams.

TABLE I.—MODIFIED POLYURETHANE FOAM PROPERTIES

| Batch No. | Foam composition | G. | Compression (ASTM No. 1621-59T), p.s.i. Strength | Compression (ASTM No. 1621-59T), p.s.i. Modulus | Burning test, wt. percent loss | Density per cubic ft. |
|---|---|---|---|---|---|---|
| KK-46 | Polyether polyol / Polymethylene polyphenylisocyanate / Trimellitic acid anhydride | 200 / 200 / 100 | 35 | 1,800 | 27 | 3.5 |
| KK-75 | Polyether polyol / Polymethylene polyphenylisocyanate / Mixtures of 50% trimellitic acid, 50% trimellitic anhydride | 200 / 200 / 200 | 20 | 1,200 | 18 | 4.4 |
| KK-77 | Polyether polyol / Polymethylene polyphenylisocyanate / Terephthalic acid | 200 / 100 / 50 | 45 | 2,500 | 28 | 9.7 |
| KK-80 | Polyether polyol / Polymethylene polyphenylisocyanate / Pyromellitic dianhydride | 200 / 200 / 75 | 85 | 2,500 | 23 | 8.8 |

TABLE II.—STANDARD FLAME TEST

| Sample identification | Commercial chlorendic acid foam | KK-46 | KK-75 | KK-77 | KK-80 |
|---|---|---|---|---|---|
| Sample gross weight | 7.205 | 16.261 | 23.253 | 22.470 | 38.678 |
| Sample core weight | 1.445 | 12.087 | 19.265 | 76.445 | 36.678 |
| Sample diameter | 5″ | 5″ | 5″ | 5″ | 5″ |
| Sample thickness | ¾ | ¾ | ¾ | ¾ | ¾ |
| Gas flow Rotometer | 0.8 | 0.8 | 0.8 | 0.8 | 0.8 |
| Oxygen flow Rotometer | 1.1 | 1.1 | 1.1 | 1.1 | 1.1 |
| Distance from nozzle-top to sample | 1¼ | 1¼ | 1¼ | 1¼ | 1¼ |
| Distance from nozzle-edge to sample edge | 1″ | 1″ | 1″ | 1″ | 1″ |
| Seconds and revolutions from nozzle to sample edge | 48 sec. 4 rev. | 48 sec. 4 rev. | 48 sec. 4 rev. | 48 sec. 4 rev. | 48 sec. 4 rev. |
| Sample weight | | 15.211 | 22.493 | 21.650 | 35.278 |
| Loss | | 4.174 | 3.988 | 6.025 | 8.000 |
| Burning weight loss | 85% | 27.4% loss | 17.7% loss | 27.8% | 22.7% |

EXAMPLES 19–22

The foams of Examples 19–22 were prepared as a single test series to demonstrate the comparative superiority in their smoking tendency of the foams of the present invention over the prior art foams. For purposes of discussion the prior art foams are referred to as "polyurethane" while the foams of the present invention are termed "modified." One major compositional distinction between the modified foams and the classical polyurethanes is the ratio of the hydroxyl groups present in the polyol component to the isocyanate groups present in the polyisocyanate component. The prior art polyurethanes are generally formulated with an hydroxyl-isocyanato functional-group ratio fo about 0.97:1.0. In contrast it has been found that the present modified foams are more suitably formulated at a lower ratio. In the examples that follow comparisons have been made between the classical polyurethane foam and the modified foam at both a high polyol (designated "H.P.") ratio of 0.97 and a low polyol (designated "L.P.") ratio of 0.54.

Sample foams of both the polyurethane type and modified type were prepared in the following way. Each foam was made in two stages by first, premixing the polyisocyanate-containing portion; next, premixing the polyol-containing portion; and then combining these two separate portions and mixing them whereupon the foaming action began. The sole difference between the preparation of the isocyanate-containing portion for the two types of foams is that in preparing a modified foam the polyfunctional aromatic carboxylic acid derivative is added in addition to the blowing agent and the polyisocyanate which comprise the sole components of the polyisocyanate-containing portion in a classical polyurethane foam. Referring to the tabulated formulations below the polyisocyanate-containing portions were prepared by mixing in the amounts indicated (above the dash line): trichlorofluoromethane and polymethylene polyphenylisocyanate having a molecular weight of 420, an equivalent weight of 133 and an average functionality of about 3.2 (designated in table as "Isocyanate"). In the modified foams in addition to the two foregoing ingredients, trimellitic anhydride was added and mixed to prepare the polyisocyanate-portion. In a separate vessel the polyol-containing portion of each formulation was prepared by mixing together in the amounts shown (below the dash line) the following ingredients: a propylene oxide adduct of sucrose, having an average molecular weight of 825 and an hydroxyl number of 530 (designated below as "Polyol #1"); a polyethylene glycol with an average molecular weight of 200 and an hydroxyl number of 560 (designated "Polyol #2"); an hydroxyl-terminated silicone glycol block copolymer (designated "Additive"); a solution of triethylene diamine dissolved in an alkanol amine (designated "Catalyst #1"); dibutyl tin diacetate (designated "Catalyst #2") and additional trichlorofluoromethane.

| Component | Example 19 Polyurethane-H.P., gms. | Example 20 Modified-H.P., gms. | Example 21 Polyurethane-L.P., gms. | Example 22 Modified-L.P., gms. |
|---|---|---|---|---|
| CCl$_3$F | 20.0 | 20.0 | 20.0 | 20.0 |
| Isocyanate | 100.0 | 100.0 | 100.0 | 100.0 |
| Trimellitic anhydride | 0.0 | 55.0 | 0.0 | 55.0 |
| Polyol #1 | 22.0 | 22.0 | 12.9 | 12.0 |
| Polyol #2 | 52.0 | 52.0 | 28.0 | 28.0 |
| Additive | 2.0 | 2.0 | 2.0 | 2.0 |
| Catalyst #1 | 0.5 | 0.5 | 0.5 | 0.5 |
| Catalyst #2 | 0.2 | 0.2 | 0.2 | 0.2 |
| CCl$_3$F | 20.0 | 20.0 | 20.0 | 20.0 |

Three replicate foams were prepared from each basic formula. From each replicate foam were cut three foam stick test specimens. Each such stick was subjected to the Chimney Test to determine its smoke evolution tendency. Thus each basic formulation was tested nine times. The values reported as "Smoke Density" in Table III, below, represent the overall average for each basic foam formulation.

TABLE III

| Example No. | Description | Smoke density |
|---|---|---|
| 19 | Poyurethane-H.P. | 71 |
| 20 | Modified-H.P. | 19 |
| 21 | Polyurethane-L.P. | 82 |
| 22 | Modified-L.P. | 15 |

Thus it can be seen that at both the high-polyol and low-polyol bases the modified foams of the present invention exhibit a surprisingly lesser tendency to generate smoke than the classical polyurethanes.

Having described the invention, we claim:
1. As a composition of matter a thermally stable foam comprising the polymeric reaction product of:
   (1) a polyfunctional aromatic carboxylic acid derivative comprising an aromatic nucleus substituted by carbonyl-based members selected from the group consisting of anhydride, carboxyl or an acyl halide;
   (2) a liquid polyarylpolyisocyanate which contains at least two interconnected aromatic rings having at least one isocyanato group per aromatic ring wherein the ratio of isocyanato groups to carbonyl-based groups has a range of about 0.6:1.0 to about 4.0:1.0; and
   (3) a polyol or mixtures of polyols having a molecular weight of less than 2,000 and having at least three hydroxyl groups per mole in an amount such that the ratio of hydroxyl groups to the sum of initial isocyanato groups plus carbonyl-based groups has a range of from about 0.1:1.0 to about 3.0:1.0.
2. The composition of claim 1 wherein the polyfunctional aromatic carboxylic acid derivative is trimellitic acid anhydride.
3. The composition of claim 1 wherein the polyfunctional aromatic carboxylic acid derivative is the acid chloride of trimellitic acid anhydride.
4. The composition of claim 1 wherein the polyfunctional aromatic carboxylic acid derivative is pyromellitic dianhydride.
5. The composition of claim 1 wherein the polyfunctional aromatic carboxylic acid derivative is 1,3,3 trimethyl-1-phenylidane-4',6 dicarboxylic acid.
6. The composition of claim 1 wherein the polyfunctional aromatic carboxylic acid derivative is phthalic anhydride.
7. The composition of claim 1 wherein the polyol is a polyether polyol or polyester polyol.
8. The composition of claim 1 wherein the ratio of hydroxyl groups of the polyol to the isocyanato groups of the liquid polyarylpolyisocyanate and the carbonyl-based groups of the polyfunctional aromatic carboxylic acid derivative is 0.1:1.0 to 0.9:1.0.
9. The composition of claim 1 wherein the polyol is a propylene oxide adduct of sucrose having an equivalent weight of 100 and an hydroxyl number 560, diluted with glycerol.
10. The composition of claim 1 wherein the polyfunctional aromatic carboxylic acid derivative is trimellitic acid anhydride and wherein the liquid polyarylpolyisocyanate is polymethylene polyphenylisocyanate wherein the ratio of isocyanato groups of polymethylene polyphenylisocyanate to carbonyl-based groups of trimellitic acid anhydride is 1.2:1.0 to 2.2:1.0 and wherein the ratio of hydroxyl groups of the polyol to the isocyanato groups of polymethylene polyphenylisocyanate and the trimellitic acid is 0.2:1.0 to 0.4:1.0.

11. As a composition of matter a thermally stable foam comprising the polymeric reaction product of:
   (1) trimellitic acid anhydride,
   (2) a liquid polyarylpolyisocyanate which liquid polyarylpolyisocyanate contains at least two interconnected aromatic rings having at least one isocyanato group per aromatic ring wherein the ratio of isocyanato groups of the liquid polyarylpolyisocyanate to the carbonyl-based groups of trimellitic acid anhydride is 1.2:1.0 to 2.2:1.0; and
   (3) a polyol which is a blend of propylene oxide adduct of pentaerythritol having a molecular weight of 400 and a hydroxyl number of 560 with a propylene oxide adduct of ethylene diamine having a molecular weight of 500 and a hydroxyl number of 450, in an amount such that the ratio of hydroxyl groups of the polyol to the sum of the isocyanato groups of the liquid polyarylpolyisocyanate plus the carbonyl-based groups of the trimellitic acid anhydride is 0.2:1.0 to 0.4:1.0.

12. As a composition of matter a thermally stable foam comprising the polymeric reaction product of:
   (1) trimellitic acid anhydride,
   (2) a liquid polyarylpolyisocyanate which liquid polyarylpolyisocyanate contains at least two interconnected aromatic rings having at least one isocyanato group per aromatic ring wherein the ratio of the isocyanato groups of the liquid polyarylpolyisocyanate to the carbonyl-based groups of the trimellitic acid anhydride is 1.2:1.0 to 2.2:1.0; and
   (3) a polyol which is a blend of a propylene oxide adduct of sucrose having a molecular weight of 400 and a hydrozyl number of 560 with a propylene oxide adduct of ethylene diamine having a molecular weight of 500 and a hydroxyl number of 450 in an amount such that the ratio of the hydroxyl groups of the polyol to the sum of the isocyanato groups of the liquid polyarylpolyisocyanate plus the carbonyl-based groups of the trimellitic acid anhydride is 0.2:1.0 to 0.4:1.0.

13. As a composition of matter a thermally stable foam comprising a polymeric reaction product of:
   (1) a liquid non-polymeric foam precursor prepared by reacting a liquid polyarylpolyisocyanate which liquid polyarylpolyisocyanate contains at least two interconnected aromatic rings and at least one isocyanato group per aromatic ring and a polyfunctional aromatic carboxylic acid derivative comprising an aromatic nucleus substituted by carbonyl-based members selected from the group consisting of carboxyl, anhydride and acyl halide wherein the ratio of the isocyanato groups of the liquid polyarylpolyisocyanate to the carbonyl-based groups of the polyfunctional aromatic carboxylic acid derivative is 0.6:1:0 to 4.0:1.0; and
   (2) a polyol having the molecular weight of less than 2,000 and having at least three hydroxyl groups per mole in amounts such that the ratio of the hydroxyl groups of the polyol to the sum of the isocyanato and carbonyl-based groups of the starting materials for foam precursor is 0.1:1.0 to 3.0:1.0.

14. The composition of claim 13 wherein the liquid polyarylpolyisocyanate is polymethylene polyphenylisocyanate and wherein the polyfunctional aromatic carboxylic acid derivative is trimellitic acid anhydride.

15. A process for producing a thermally stable foam which comprises the reacting at ambient temperatures and without the addition of external heat or pressure to the reaction system:
   (1) a polyfunctional aromatic carboxylic acid derivative comprising an aromatic nucleus substituted by carbonyl-based members selected from the group consisting of anhydride, carboxylic or acyl halide,
   (2) a liquid polyarylpolyisocyanate which liquid polyarylpolyisocyanate contains at least two interconnected aromatic rings having at least one isocyanato group per aromatic ring wherein the ratio of the isocyanato groups of the liquid polyarylpolyisocyanate to the carbonyl-based groups of the polyfunctional aromatic carboxylic acid derivative is 0.6:1.0 to 4.0:1.0; and
   (3) a polyol having a molecular weight of less than 2,000 and having at least three hydroxyl groups per mole in an amount such that the ratio of the hydroxyl groups of the polyol to the sum of the isocyanato groups of the liquid polyarylpolyisocyanate plus the carbonyl-based groups of the aromatic carboxylic acid derivative is 0.1:1.0 to 3.0:1.0.

16. The process of claim 15 wherein a fluorocarbon blowing agent, boiling above 20° C., is present in the reaction system.

17. The process of claim 15 wherein the liquid polyarylpolyisocyanate is polymethylene polyphenylisocyanate.

18. The process of claim 15 wherein the polyfunctional aromatic carboxylic acid derivative is trimellitic anhydride.

19. The process of claim 15 wherein the polyfunctional aromatic carboxylic acid derivative is the acid chloride of trimellitic acid anhydride.

20. The process of claim 15 wherein the polyfunctional aromatic carboxylic acid derivative is pyromellitic dianhydride.

21. The process of claim 15 wherein a sufficient amount of water is used to initiate the reaction and wherein the ratio of the isocyanato groups of the liquid polyarylpolyisocyanate to the carbonyl-based groups of the polyfunctional aromatic carboxylic acid derivative is 0.5:1.0 to 2.5:1.0.

22. A process for producing thermally stable foam which consists of reacting at ambient temperatures and without the addition of external heat or pressure to the reaction system:
   (1) a liquid non-polymeric foam precursor prepared by reacting a liquid polyarylpolyisocyanate which liquid polyarylpolyisocyanate contains at least two interconnected aromatic rings and at least one isocyanato group per aromatic ring and a polyfunctional aromatic carboxylic acid derivative comprising an aromatic nucleus substituted by carbonyl-based members selected from the group consisting of carboxyl, acyl halide and an anhydride wherein the ratio of the isocyanato groups of the liquid polyarylpolyisocyanate to the carbonyl-based groups of the polyfunctional aromatic carboxylic acid derivative is 0.6:1.0 to 4.0:1.0; and
   (2) then reacting the precursor with a polyol having a molecular weight of less than 2,000 and having at least three hydroxyl groups per mole in an amount such that the ratio of the hydroxyl groups of the polyol to the sum of the isocyanato and carbonyl-based groups in the starting materials for the foam precursor is 0.1:1.0 to 3.0:1.0.

23. A process for producing a thermally stable foam which consists of reacting at ambient temperatures and without the addition of external heat or pressure to the reaction system:
   (1) a liquid non-polymeric precursor prepared by reacting a liquid polyarylpolyisocyanate which liquid polyarylpolyisocyanate contains at least two interconnected aromatic rings having at least one isocyanato group per aromatic ring and trimellitic acid anhydride wherein the ratio of the isocyanato groups of the polyarylpolyisocyanate to the carbonyl-based groups of the trimellitic acid anhydride is 0.6:1.0 to 4.0:1.0; and
   (2) reacting the precursor with a polyol in an amount such that the ratio of the hydroxyl groups of the polyol to the sum of the isocyanato and carbonyl-based groups in the starting materials of the foam precursor is 0.1:1.0 to 3.0:1.0.

References Cited

UNITED STATES PATENTS

| | | | |
|---|---|---|---|
| 3,072,582 | 1/1963 | Frost | 260—2.5 |
| 3,300,420 | 1/1967 | Frey | 260—2.5 |
| 3,317,480 | 5/1967 | Fetscher et al. | 260—77.5 |

DONALD E. CZAJA, Primary Examiner

M. J. WELSH, Assistant Examiner

U.S. Cl. X.R.

260—2.5 AM, 2.5 AQ, 2.5 AR, 2.5 AS

PO-1050
(5/69)

UNITED STATES PATENT OFFICE
CERTIFICATE OF CORRECTION

Patent No. 3,637,543                    Dated    January 25, 1972

Inventor(s)  Stanley T. Kus and Fred W. Koenig

It is certified that error appears in the above-identified patent and that said Letters Patent are hereby corrected as shown below:

Col. 2, line 7 "lest" should be "least"

Col. 2, line 57  Sentence omitted  After the word "group" it should read "Compounds joined by an ethylene or propylene group are representative of this type of a compound. In case the ester linkages are joined by"

Col. 3, line 5 "anhodride" should be "anhydride"

Col. 3, line 15  "polyarylpolusocyanate" should be "polyarylpolyisocyanate"

Col. 14, line 28 "as" should be "has"

Col. 15, line 14  "fo" should be "of".

Signed and sealed this 10th day of October 1972.

(SEAL)
Attest:

EDWARD M. FLETCHER, JR.
Attesting Officer

ROBERT GOTTSCHALK
Commissioner of Patents